United States Patent [19]

Heon et al.

[11] Patent Number: 5,137,361
[45] Date of Patent: Aug. 11, 1992

[54] OPTICAL DETECTION OF A SURFACE MOTION OF AN OBJECT USING A STABILIZED INTERFEROMETRIC CAVITY

[75] Inventors: Rene Heon, Longueuil; Jean-Pierre Monchalin, Montreal, both of Canada

[73] Assignee: National Research Council of Canada, Ottawa, Canada

[21] Appl. No.: 674,797

[22] Filed: Mar. 25, 1991

[30] Foreign Application Priority Data

Mar. 29, 1990 [CA] Canada .................................. 2013406

[51] Int. Cl.$^5$ .............................................. G01B 9/02
[52] U.S. Cl. .................................... 356/352; 356/358; 73/657
[58] Field of Search ................. 356/358, 352; 73/655, 73/657

[56] References Cited

U.S. PATENT DOCUMENTS

| 4,046,477 | 9/1977 | Kaule | 356/358 |
| 4,381,676 | 5/1983 | Kaule et al. | 356/358 |
| 4,420,260 | 12/1983 | Martinelli . | |
| 4,627,731 | 12/1986 | Waters et al. . | |
| 4,633,715 | 1/1987 | Monchalin | 356/358 |
| 4,652,129 | 3/1987 | Martinelli . | |
| 4,659,224 | 4/1987 | Monchalin | 356/352 |
| 4,966,459 | 10/1990 | Monchalin | 356/352 |

*Primary Examiner*—Samuel A. Turner
*Attorney, Agent, or Firm*—Collard & Roe

[57] ABSTRACT

An optical detection of a surface motion of an object is disclosed. An optical interferometer receives a laser light which is scattered from the surface of the object and transmitted through a substantial length of an optical fiber. The stabilization is carried out by a signal which is obtained by processing signals generated by a reference detector and a stabilization detector located respectively at the input side and the output side of the interferometer.

24 Claims, 2 Drawing Sheets

OPTICAL DETECTION OF A SURFACE MOTION OF AN OBJECT USING A STABILIZED INTERFEROMETRIC CAVITY

FIELD OF THE INVENTION

The present invention relates generally to optical detection of a motion of the surface of an object. In particular, it is directed to a laser interferometric detection of ultrasound and surface transient motion.

BACKGROUND OF THE INVENTION

It is well known that an optical interferometer, e.g. Fabry-Pérot, Michelson, Mach-Zehnder types, when properly tuned to the laser frequency, can be used to detect ultrasound and other surface transient motion. One of the present inventors (J-P. Monchalin) has shown in his U.S. Pat. No. 4,659,224—Apr. 21, 1987, that a confocal Fabry-Pérot interferometer can be used in the transmission mode for such a detection technique. J-P. Monchalin also describes in his copending U.S. application Ser. No. 07/310,380 filed Feb. 15, 1989, now U.S. Pat. No. 4,966,459 arrangements in which a confocal Fabry-Pérot is used in the reflection mode (or sometimes called the optical sideband stripping mode).

In most embodiments described in these two documents and other prior art devices, stabilization of the confocal Fabry-Pérot or other interferometer with respect to the laser frequency is performed generally by deriving an additional beam (the stabilization beam) from the output of the laser. This beam is then superimposed colinearly with the beam scattered off the surface and both are sent into the confocal Fabry-Pérot. The stabilization ensures that the laser frequency is always located at the most sensitive point on the resonance curve of the interferometer. Polarization optics is generally used to separate these two beams in front of the signal and stabilization detectors. Such an arrangement has the advantage to permit stabilization independently of the reflectivity of the surface but it has the drawback to require to locate the laser in the immediate vicinity of the receiving confocal Fabry-Pérot. A solution which could be considered would be to couple this stabilization beam through an optical fiber, but this causes an additional complexity. A convenient setup should therefore provide stabilization by using only the beam scattered off the surface, without a stabilization beam. U.S. Pat. No. 4,659,224 teaches a further embodiment in which no separate stabilization beam is used. However, in that embodiment, the laser beam is phase modulated before it strikes the surface. RF filters are used to separate the stabilization signal from the ultrasound signal.

OBJECTS OF THE INVENTION

It is therefore an object of the present invention to provide a method of and an apparatus for optically detecting a motion of the surface of an object.

It is a further object or the present invention to provide a method of and an apparatus for optically and remotely detecting a motion of the surface of an object in which stabilization is carried out in its operation.

It is still another object of the present invention to provide a method of and an apparatus for optically and remotely detecting a motion of the surface of an object in which the stabilization requires no separate stabilization beam.

It is yet a further object of the present invention to provide a method of and an apparatus for optically detecting a motion of the surface of an object in which an optical fiber is used to transmit the scattered light to an interferometer.

SUMMARY OF THE INVENTION

Briefly stated, the present invention is directed to an optical method of detecting laser light which is scattered by an object and is responsive to a motion of the surface of the object which includes steps of transmitting the scattered laser light through an optical fiber having a substantial length and receiving the scattered laser light transmitted through the optical fiber by an optical interferometer to generate an output signal indicative of the motion. The invention is characterized in further steps of measuring the intensity of the scattered laser light at the output of the interferometer to generate a pre-stabilization signal and measuring the intensity of the scattered laser light at the input of the interferometer to generate a reference signal. The invention further includes steps of electronically generating a ratio signal indicative of the ratio between the reference signal and the pre-stabilization signal and processing the ratio signal to generate a final stabilization signal which is used to ensure a proper operation of the interferometer.

The present invention is further directed to an optical apparatus for detecting laser light scattered from an object and indicative of a motion of the surface of the object. The apparatus includes a substantial length of an optical fiber for transmitting the scattered laser light therethrough and an optical interferometer for receiving the scattered laser light transmitted through the optical fiber to generate an output signal indicative of the motion. The invention further includes stabilization detector means for measuring the intensity of the scattered laser light at the output of the interferometer to generate a pre-stabilization signal and reference detector means for measuring the intensity of the scattered laser light at the input of the interferometer to generate a reference signal. The apparatus further includes ratio means for electronically generating a ratio signal indicative of the ratio between the reference signal and the pre-stabilization signal and processing means for processing the ratio signal to generate a final stabilization signal which is used to ensure a proper operation of the interferometer.

BRIEF DESCRIPTION OF THE ACCOMPANYING DRAWINGS

For a more complete understanding of the present invention and for further objects and advantages thereof, references may now be made to the following description taken in conjunction with the accompanying drawings in which.

DETAILED DESCRIPTION OF THE PREFERRED EMBODIMENTS OF THE INVENTION

Figure 1:
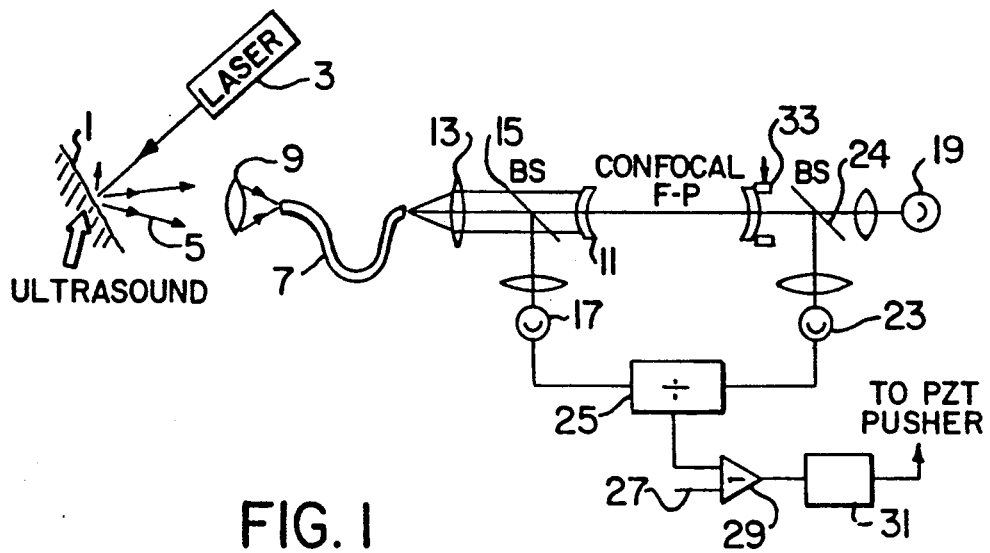
FIG. 1 is a schematic illustration of an embodiment of the present invention in which a Fabry-Pérot interferometer is used in the transmission mode.

The principle of the present invention is first described. An important feature of this invention consists in the use of a detector (reference detector) to measure the light intensity received from the surface at the input of the interferometer. Light transmitted through the interferometer is measured by a stabilization detector. By dividing, with an analog divider, the signal from the stabilization detector by the signal from the reference detector, a ratio which depends only on the optical parameters of the interferometer, on its illumination distribution and on the value of the laser frequency with respect to its resonance frequency, is obtained. When the laser frequency is swept (or the resonance frequency of the interferometer), a resonance curve, which depends only on the optical parameters of the interferometer and how it is illuminated, is obtained.

In order to stabilize the interferometer to the laser frequency, this ratio signal is then compared to a preset level using a differential amplifier. Generally, this preset level is chosen to correspond to half resonance peak height or half resonance dip depth. The differential signal is then applied to a frequency control means which either shifts the laser frequency or the interferometer resonance frequency. In U.S. Pat. No. 4,659,224 mentioned above, this principle is used to eliminate the effect of laser intensity fluctuations on the frequency locking of the laser to the Fabry-Pérot. These fluctuations are typically a few percent to, in the worst case, several tens percents. However, if this principle is applied to the beam scattered by the surface of the specimen, variations of the received intensity by several orders of magnitude can be encountered depending on the surface reflectivity, texture and orientation. It has been found by the applicants that such a system described in the patent, although usable in practice, is not of a general use, since it has the drawback that a ratio signal depends upon the illumination distribution of the confocal Fabry-Pérot. In the case where the distance between the optical receiver and the surface is not constant, some kind of autofocusing means is necessary in order to bring the image of the probed surface at a fixed location with respect to the confocal Fabry-Pérot (generally on a mirror or half way between the mirrors). Even if the image is at a fixed location, its size is going to change when the distance between the optical receiver and the surface is changing (unless a very complex autofocusing and automagnifying optical system is devised). Therefore, as a consequence, the ratio signal is likely to vary in magnitude (which has the consequence of giving a stabilization point at an improper location, since the preset level is fixed) and in shape (which has the consequence to modify the response to ultrasonic frequencies). It should be noted that such a problem was not encountered with the stabilization beam, since in this case the illumination of the interferometer is constant and well defined.

The present invention further provides constant illumination conditions for the interferometer, making the division principle applied to the scattered beam useful in practice. Such a result is obtained by coupling the light from the surface into a large core optical fiber (typically more than 100 μm in diameter) of sufficient length. In this case, the illumination distribution at the output of the fiber is sensibly independent of the one at the input because, after a sufficient length, light is coupled into all the guided modes and light emerges at output from the fiber core within a well defined solid angle. Additional fiber bending or microbending may be used in the case of too short fiber lengths prone to give an output illumination distribution dependent upon the input coupling conditions.

FIG. 1 illustrates schematically one of the preferred embodiments of the present invention, which is applicable to the use of the confocal Fabry-Pérot in the transmission mode.

It should be noted here that the present invention is applicable to other types of interferometers or other interferometers of the confocal Fabry-Pérot type, including those which are plane confocal (a planar mirror located at the focal distance of a concave mirror) or are equivalent to a plane confocal configuration.

Referring to FIG. 1, an ultrasound wave or other excitation produces at the surface of an object 1 deformation which may be oscillatory or transient. A laser 3 emits an incident beam of light towards the surface which in turn scatters it. An optical fiber 7, provided with an optional light collecting optics 9, e.g. lenses, etc., transmits a portion of the scattered laser light through its output end to a confocal Fabry-Pérot interferometer 11. Appropriate optics 13 is provided to adjust the scattered laser light emerging from the optical fiber in order to provide proper illumination of the interferometer. A beam splitter 15 is positioned at the input end of the Fabry-Pérot 11 to deflect a small portion of the scattered laser light towards a reference detector 17. The remaining scattered laser light passes through the Fabry-Pérot 11. The light emerging from the output of the Fabry-Pérot is detected by a signal detector 19 which generates a signal representative of a motion of the surface of the object. Another beam splitter 24 deflects a small portion of the output light towards a stabilization detector 23. The corresponding electronic signal outputs (reference signal and prestabilization signal) from the detectors 17 and 23, respectively, are fed to a divider 25 and its output (a ratio signal) is compared with a preset voltage 27 at a differential amplifier 29. The correction signal from the differential amplifier 29 is sent to a stabilization network 31 to produce a final stabilization signal which drives the piezoelectric pusher 33 of the Fabry-Pérot to control its resonance frequency. Of course, the stabilization network can be designed to control the laser frequency of the incident beam instead of the resonance frequency of the Fabry-Pérot.

Figure 2:
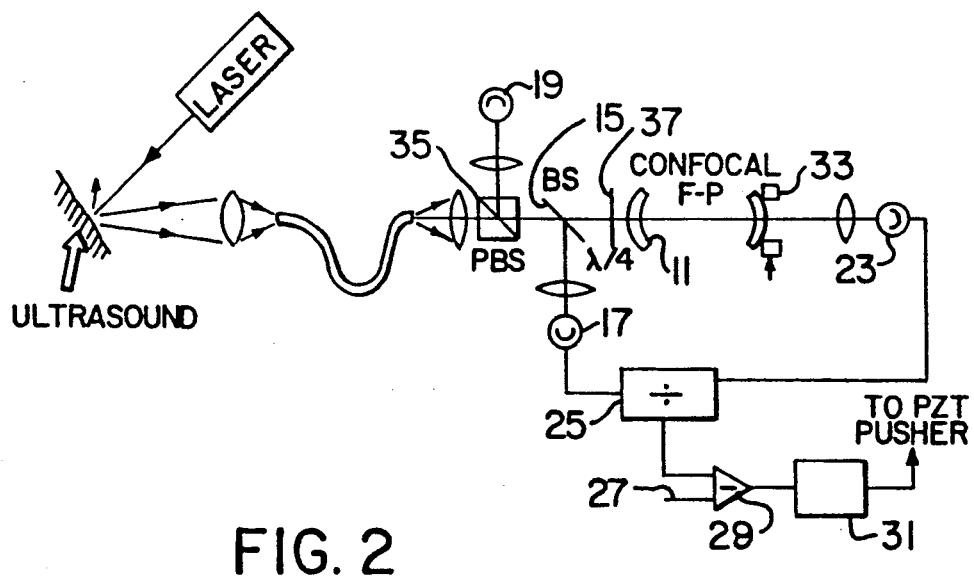
FIG. 2 is a schematic illustration of another embodiment of the present invention in which a Fabry-Pérot interferometer is used in the reflection/sideband stripping mode.

FIG. 2 depicts schematically a similar arrangement to that in FIG. 1 with an exception that the Fabry-Pérot in this embodiment is used in the reflection/sideband stripping mode. Therefore, a polarizing beam splitter 35 and a quarter-wave plate 37 are provided to facilitate the optimum operation in this mode. Like numerals are used in FIG. 2 to designate like elements shown in FIG. 1. Thus the signal detector 19 is located at the input side of the Fabry-Pérot 11 to receive the reflected output light from the interferometer. The signals from the detectors 17 and 23 are likewise processed to control the resonance frequency of the Fabry-Pérot by piezoelectric pushers 33.

The beam splitters shown in the figures are typically low reflection/high transmission beam splitters and thus deflect a small portion of the incoming light. Also, alternatively, the stabilization detector and the signal detector in FIG. 1 can be a single detector from which the pre-stabilization signal is taken by DC coupling and the surface motion signal through a high pass filter.

Figure 3:
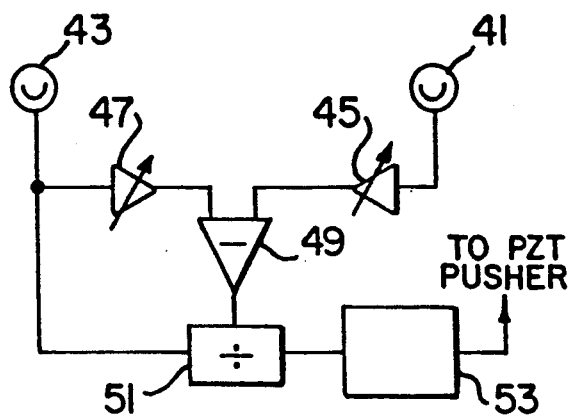
FIGS. 3 and 4 are block diagrams of stabilization circuits according to still other embodiments of the present invention.

FIG. 3 shows another embodiment of the stabilization circuit, which also uses a divider and a differential amplifier. The signals from the stabilization and reference detectors 41 and 43, respectively, are sent to amplifiers 45 and 47 with adjustable gains and then compared by a differential amplifier 49. Adjustable gains permit to select the proper stabilization level. The correction signal is kept at the same level independently of the amount of light received by the interferometer by dividing it at a divider 51 by the signal given by the reference detector and is sent to a stabilization network 53. In this way, the stabilization loop operates properly for a wide range of received light intensities.

When the single frequency laser has a strong frequency jitter in the 100 Hz-1 KHz range with excursions exceeding the interferometer bandwidth, it is difficult to have adequate stabilization by using a piezoelectric pusher which has a frequency response typically limited to 1-5 KHz. Above this range, mechanical resonances of the pusher are generally found and limit its use. Although other frequency shifting means of wider bandwidth are possible, these are generally of more complex use, such as the one based on the acoustooptic effect.

Figure 4:
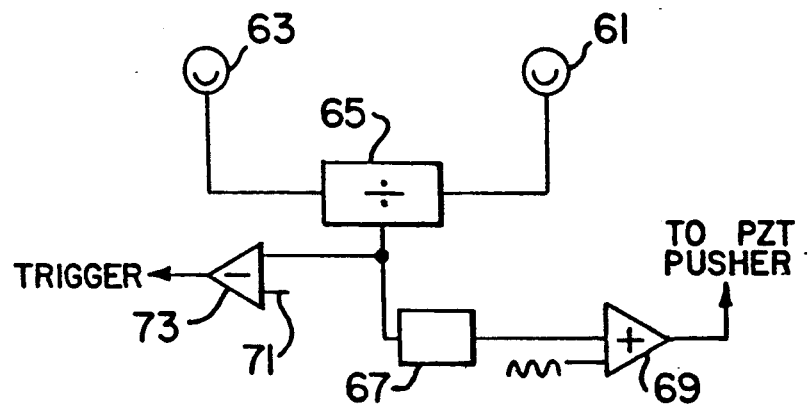

An embodiment shown in FIG. 4 obviates such difficulties. The principle consists in making the stabilization point to oscillate along the slope of a transmission peak or reflection dip and in providing a trigger pulse signal when the stabilization point is at the proper location, i.e. generally at half height or depth. This pulse signal is then used to trigger the ultrasonic source (piezoelectric transducer or laser). Generally, the delay between the trigger pulse and the time of detection of ultrasound at the surface of the specimen is sufficiently short, so that the stabilization point has not moved significantly from its optimum location under the forced oscillation and the laser frequency jitter. This delay is the sum of the generation delay of the ultrasonic generating system and the delay of propagation of ultrasound from the source to the surface of detection (typically less than 10 $\mu$s). The generation delay is typically less than 1 $\mu$s for electrical pulsers used to excite piezoelectric ultrasonic transducers and for several lasers used to generate ultrasound, such as excimer and carbon dioxide lasers. It is, however, longer for flashlamp pump Q-switch lasers, as long as 1 ms. Such a longer delay can be taken into account by choosing a suitable preset trigger level which gives a trigger pulse in advance by the generation delay.

This principle can be implemented by a further embodiment shown in FIG. 4, in which stabilization and reference detectors 61 and 63 respectively feed signals to a divider 65 whose output is sent to a stabilization network 67. At an amplifier 69, the ratio signal from the stabilization network is added to a modulation sine or ramp signal of sufficient amplitude oscillating at a few hundred Hz. The stabilization network is similar to the one used previously. The stabilization level is compared to a preset level 71 corresponding to half peak height or half dip depth or to a different value chosen to take into account generation delay at a comparator 73. The comparator circuit produces the pulse which triggers the ultrasonic source.

We claim:

1. An optical method of detecting laser light which is scattered by an object and is responsive to a motion of the surface of the said object, comprising steps of:
   transmitting the said scattered laser light through an optical fiber,
   receiving the said scattered laser light transmitted through the said optical fiber by an optical interferometer to generate an output signal indicative of the said motion,
   measuring the intensity of the said scattered laser light at the output of the said interferometer to generate a prestabilization signal,
   measuring the intensity of the said scattered laser light at the input of the said interferometer to generate a reference signal,
   electronically generating a ratio signal indicative of the ratio between the said prestabilization signal and the said reference signal, and
   processing the said ratio signal to generate a final stabilization signal which is used to ensure a proper operation of the said interferometer.

2. The optical method of detecting laser light, according to claim 1, wherein:
   the step of receiving is carried out by a confocal Fabry-Pérot type interferometer arranged in one of the following modes, the transmission mode and the reflection mode, and
   the step of processing includes a step of applying the said final stabilization signal to the said confocal Fabry-Pérot type interferometer.

3. The optical method of detecting laser light, according to claim 2, wherein:
   the scattered laser light is transmitted through a large core optical fiber having a substantial length to ensure the output illumination distribution of the said optical fiber substantially independent of illumination conditions at the input thereof.

4. The optical method of detecting laser light according to claim 2 wherein:
   the scattered laser light is transmitted through an optical fiber having bendings therein to ensure the output illumination distribution of the said optical fiber substantially independent of illumination conditions at the input thereof.

5. The optical method of detecting laser light, according to claim 3, wherein:
   the step of processing includes a step of comparing the said ratio signal with a preset value.

6. The optical method of detecting laser light, according to claim 3, wherein:
   the step of electronically generating a ratio signal includes steps of gain-adjustably amplifying the said reference signal and the said pre-stabilization signal and comparing the amplified signals.

7. The optical method of detecting laser light, according to claim 4, wherein:
   the step of processing includes a step of comparing the said ratio signal with a preset value.

8. The optical method of detecting laser light, according to claim 4, wherein:
   the step of electronically generating a ratio signal includes steps of gain-adjustably amplifying the said reference signal and the said pre-stabilization signal and comparing the amplified signals.

9. The optical method of detecting laser light, according to claim 3, wherein:
   the step of processing includes steps of generating a trigger signal for triggering the generation of the said motion of the surface of the said object and modulating the said final stabilization signal with a predetermined modulation signal.

10. The optical method of detecting laser light, according to claim 9, wherein:
the said modulation signal is a sine wave or ramp signal oscillating at a few hundred Hz.

11. The optical method of detecting laser light, according to claim 4, wherein:
the step of processing includes steps of generating a trigger signal for triggering the generation of the said motion of the surface of the said object and modulating the said final stabilization signal with a predetermined modulation signal.

12. The optical method of detecting laser light, according to claim 11, wherein:
the said modulation signal is a sine wave or ramp signal oscillating at a few hundred Hz.

13. An optical apparatus for detecting laser light which is scattered by an object and is responsive to a motion of the surface of the said object, comprising:
a length of an optical fiber for transmitting the said scattered laser light therethrough, and
an optical interferometer for receiving the said scattered laser light transmitted through the said optical fiber to generate an output signal indicative of the said motion,
stabilization detector means for measuring the intensity of the said scattered laser light at the output of the said interferometer to generate a prestabilization signal,
reference detector means for measuring the intensity of the said scattered laser light at the input of the said interferometer to generate a reference signal,
ratio means for electronically generating a ratio signal indicative of the ratio between the said prestabilization signal and the said reference signal, and
processing means for processing the said ratio signal to generate a final stabilization signal which is used to ensure a proper operation of the said interferometer.

14. The optical apparatus for detecting laser light, according to claim 13, wherein:
the said optical interferometer is a confocal Fabry-Pérot type interferometer arranged in one of the following modes, the transmission mode and the reflection mode, and
the said processing means includes an electrical connection for applying the said final stabilization signal to the said confocal Fabry-Pérot type interferometer.

15. The optical apparatus for detecting laser light, according to claim 14 wherein:
the said optical fiber has a large core and a substantial length to ensure illumination distribution at the output thereof substantially independent of illumination conditions at the input thereof.

16. The optical apparatus for detecting laser light, according to claim 14, wherein:
the said optical fiber has bindings therein to ensure illumination distribution at the output thereof substantially independent of illumination conditions at the input thereof.

17. The optical apparatus for detecting laser light, according to claim 15, wherein:
the said processing means includes a differential amplifier for comparing the said ratio signal with a preset value.

18. The optical apparatus for detecting laser light, according to claim 15, wherein:
the said ratio means includes adjustable gain amplifiers for amplifying the said reference signal and the said prestabilization signal and a differential amplifier for comparing the amplified signals from the said adjustable gain amplifiers.

19. The optical apparatus for detecting laser light, according to claim 16, wherein:
the said processing means includes a differential amplifier for comparing the said ratio signal with a preset value.

20. The optical apparatus for detecting laser light, according to claim 16, wherein:
the said ratio means includes adjustable gain amplifiers for amplifying the said reference signal and the said prestabilization signal and a differential amplifier for comparing the amplified signals from the said adjustable gain amplifiers.

21. The optical apparatus for detecting laser light, according to claim 15, wherein:
the said processing means includes a comparator for generating a trigger pulse to trigger the generation of the said motion of the surface of the said object and an amplifier for modulating the said final stabilization signal with a predetermined modulation signal.

22. The optical apparatus for detecting laser light, according to claim 21, wherein:
the said modulation signal is a sine wave or ramp signal oscillating at a few hundred Hz.

23. The optical apparatus for detecting laser light, according to claim 16, wherein:
the said processing means includes a comparator for generating a trigger pulse to trigger the generation of the said motion of the surface of the said object and an amplifier for modulating the said final stabilization signal with a predetermined modulation signal.

24. The optical apparatus for detecting laser light, according to claim 23, wherein:
the said modulation signal is a sine wave or ramp signal oscillating at a few hundred Hz.

* * * * *